US012152215B2

United States Patent
Kato

(10) Patent No.: US 12,152,215 B2
(45) Date of Patent: *Nov. 26, 2024

(54) SHOCK ABSORBER LUBRICANT COMPOSITION, SHOCK ABSORBER, AND METHOD FOR ADJUSTING FRICTIONAL PROPERTY OF SHOCK ABSORBER LUBRICANT

(71) Applicant: KYB Corporation, Tokyo (JP)

(72) Inventor: Shinji Kato, Tokyo (JP)

(73) Assignee: KYB CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/010,601

(22) PCT Filed: Jun. 15, 2021

(86) PCT No.: PCT/JP2021/022675
§ 371 (c)(1),
(2) Date: Dec. 15, 2022

(87) PCT Pub. No.: WO2021/256465
PCT Pub. Date: Dec. 23, 2021

(65) Prior Publication Data
US 2023/0313064 A1    Oct. 5, 2023

(30) Foreign Application Priority Data
Jun. 19, 2020   (JP) ................................. 2020-105938

(51) Int. Cl.
*C10M 129/74* (2006.01)
*C10M 129/76* (2006.01)
(Continued)

(52) U.S. Cl.
CPC ........ *C10M 129/74* (2013.01); *C10M 129/76* (2013.01); *C10M 169/04* (2013.01);
(Continued)

(58) Field of Classification Search
CPC ............ C10N 2040/08; C10N 2030/06; C10N 2010/04; F16F 9/3278; F16F 2230/04;
(Continued)

(56) References Cited

U.S. PATENT DOCUMENTS

2007/0259792 A1* 11/2007 Null ................... C10M 169/041
508/583
2015/0038384 A1    2/2015 Sakanoue
(Continued)

FOREIGN PATENT DOCUMENTS

JP      2012-224653 A    11/2012
JP      2018-203953 A    12/2018
(Continued)

OTHER PUBLICATIONS

Nakanishi, "Technical Trends and Tribology of Shock Absorber", Tribologist, 2009 (vol. 54), No. 9, p. 598, with partial English translation; cited in the specification.
(Continued)

*Primary Examiner* — Vishal V Vasisth
(74) *Attorney, Agent, or Firm* — WHDA, LLP

(57) ABSTRACT

Provided are a lubricant composition for shock absorbers, a lubricant additive, and a method of adjusting frictional property of a lubricant composition for shock absorbers, each capable of satisfying both the steering stability and ride comfort. The lubricant composition for shock absorbers contains a base oil and pentaerythritol esters and having frictional property represented by the following formula (1):

$$RI > 1.75 \times F_{ave} - 0.05 \quad (1)$$

supposing that a ratio ($\{F_{sa} - F_{ave}\}/F_{ave}$) of a difference, at the time of minute amplitude, between a peak frictional force $F_{sa}$ in transition from a stationary state to a sliding state
(Continued)

and an average frictional force $F_{ave}$ to the average frictional force $F_{ave}$ at the time of minute amplitude is responsiveness RI.

14 Claims, 9 Drawing Sheets

(51) Int. Cl.
  *C10M 169/04* (2006.01)
  *C10N 40/08* (2006.01)
(52) U.S. Cl.
  CPC .............. *C10M 2203/003* (2013.01); *C10M 2207/2835* (2013.01); *C10N 2040/08* (2013.01); *F16F 2224/04* (2013.01); *F16F 2230/04* (2013.01)
(58) Field of Classification Search
  CPC .......... F16F 2224/04; C10M 171/00; C10M 129/76; C10M 129/74; C10M 169/04; C10M 2207/289; C10M 2207/2835; C10M 2203/003; C10M 2207/283; C10M 2223/045
  See application file for complete search history.

(56) References Cited

U.S. PATENT DOCUMENTS

| | | |
|---|---|---|
| 2015/0184107 A1 | 7/2015 | Sakanoue et al. |
| 2016/0194576 A1 | 7/2016 | Sakanoue et al. |
| 2021/0380897 A1 | 12/2021 | Kato |

FOREIGN PATENT DOCUMENTS

| | | |
|---|---|---|
| WO | 2013/141235 A1 | 9/2013 |
| WO | 2014/010697 A1 | 1/2014 |
| WO | 2015/025972 A1 | 2/2015 |
| WO | 2020/084606 A1 | 4/2020 |

OTHER PUBLICATIONS

International Search Report dated Sep. 14, 2021, issued in counterpart International Application No. PCT/JP2021/022675.
Office Action dated Feb. 27, 2024, issued in counterpart CN Application No. 202180043553.3, with English translation. (15 pages).

* cited by examiner

[Fig.1]
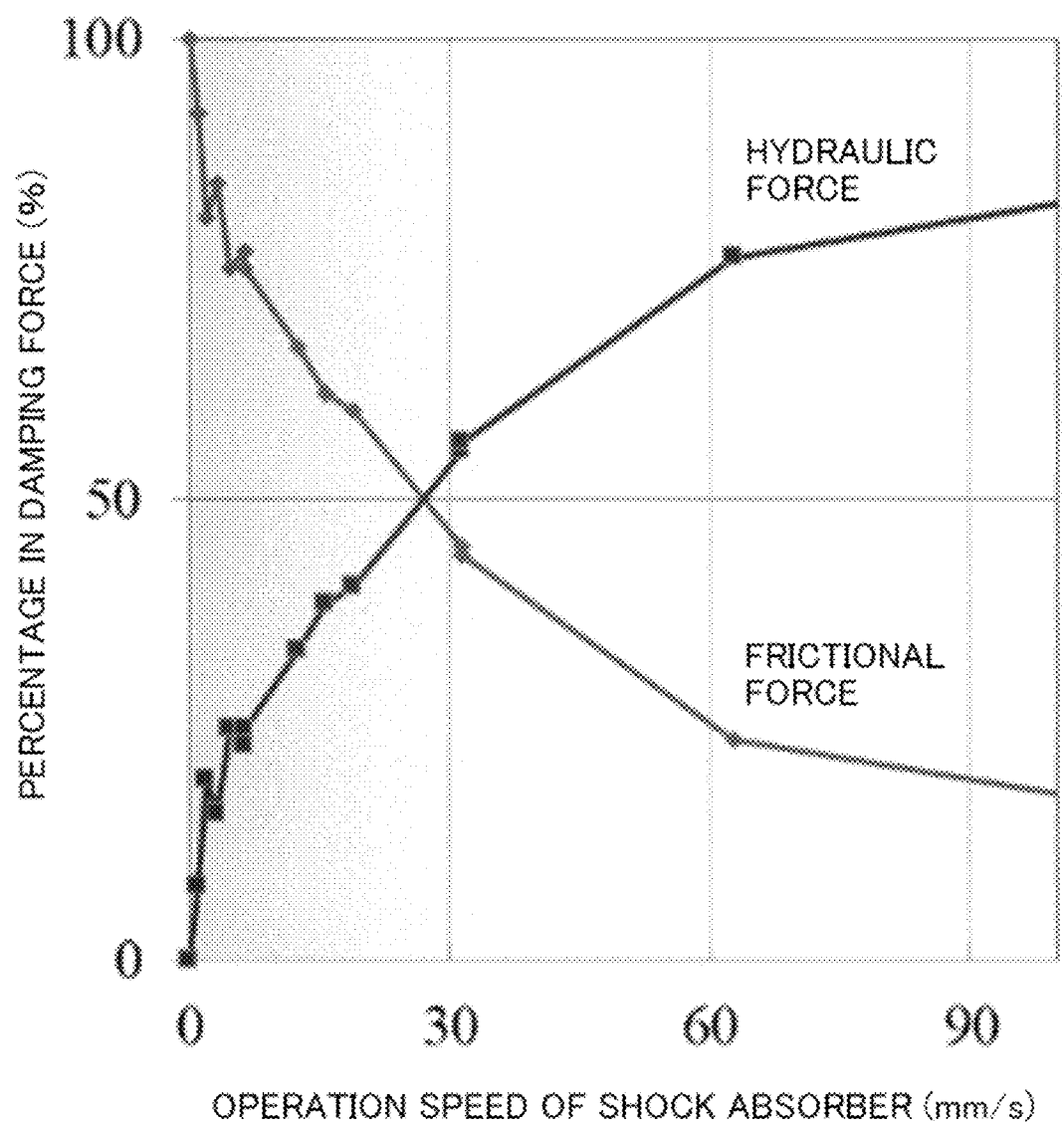

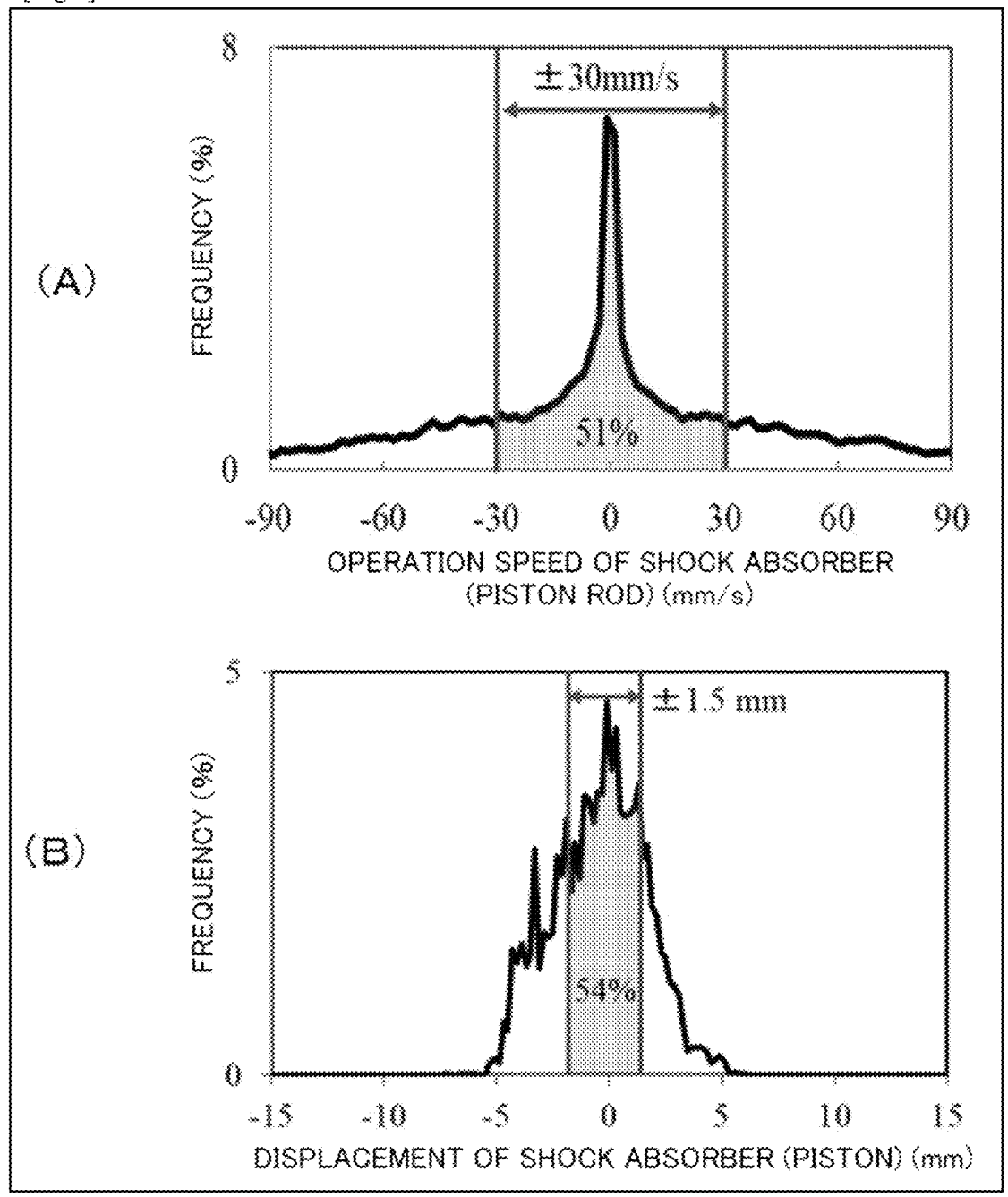
[Fig.2]

[Fig.3]
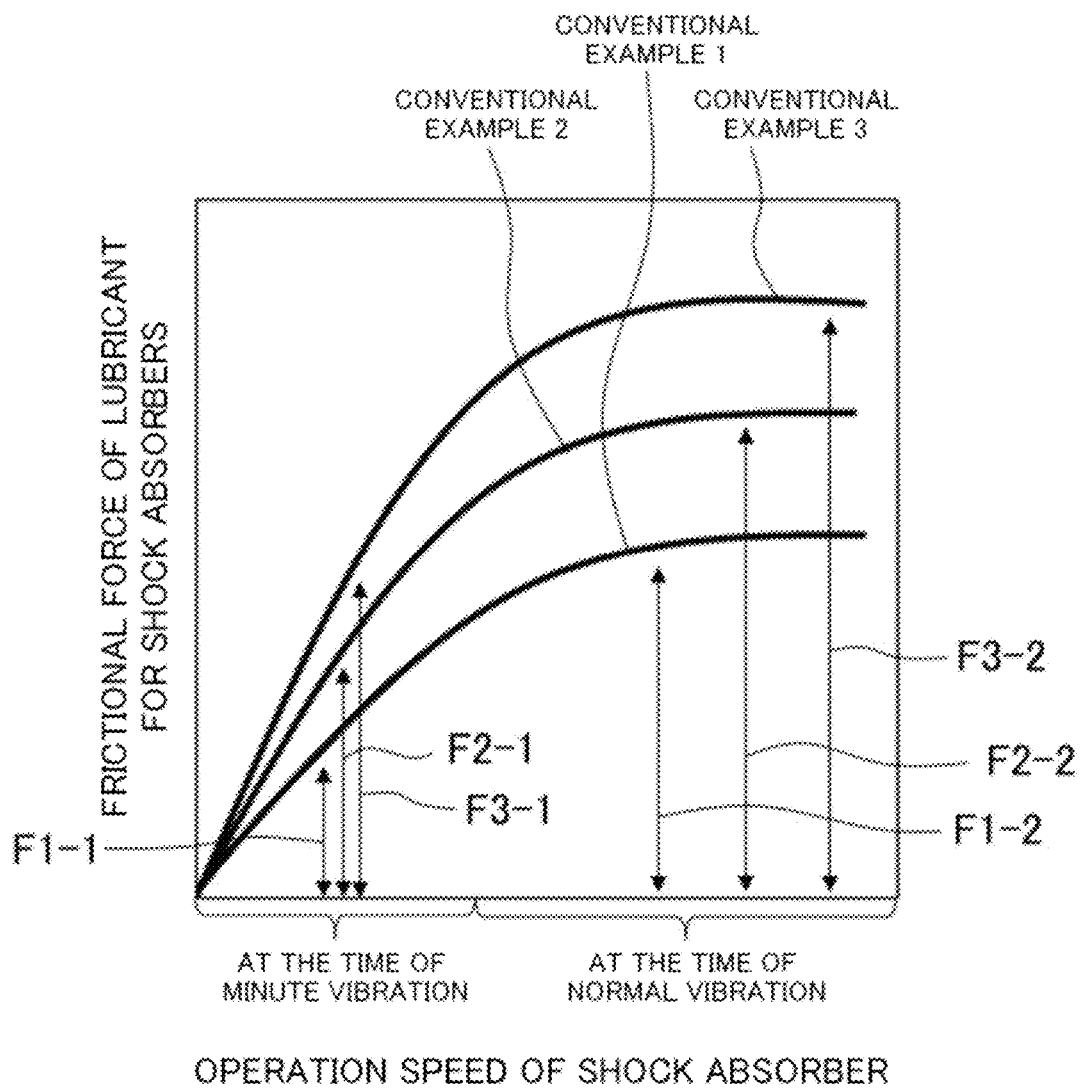

[Fig.4]
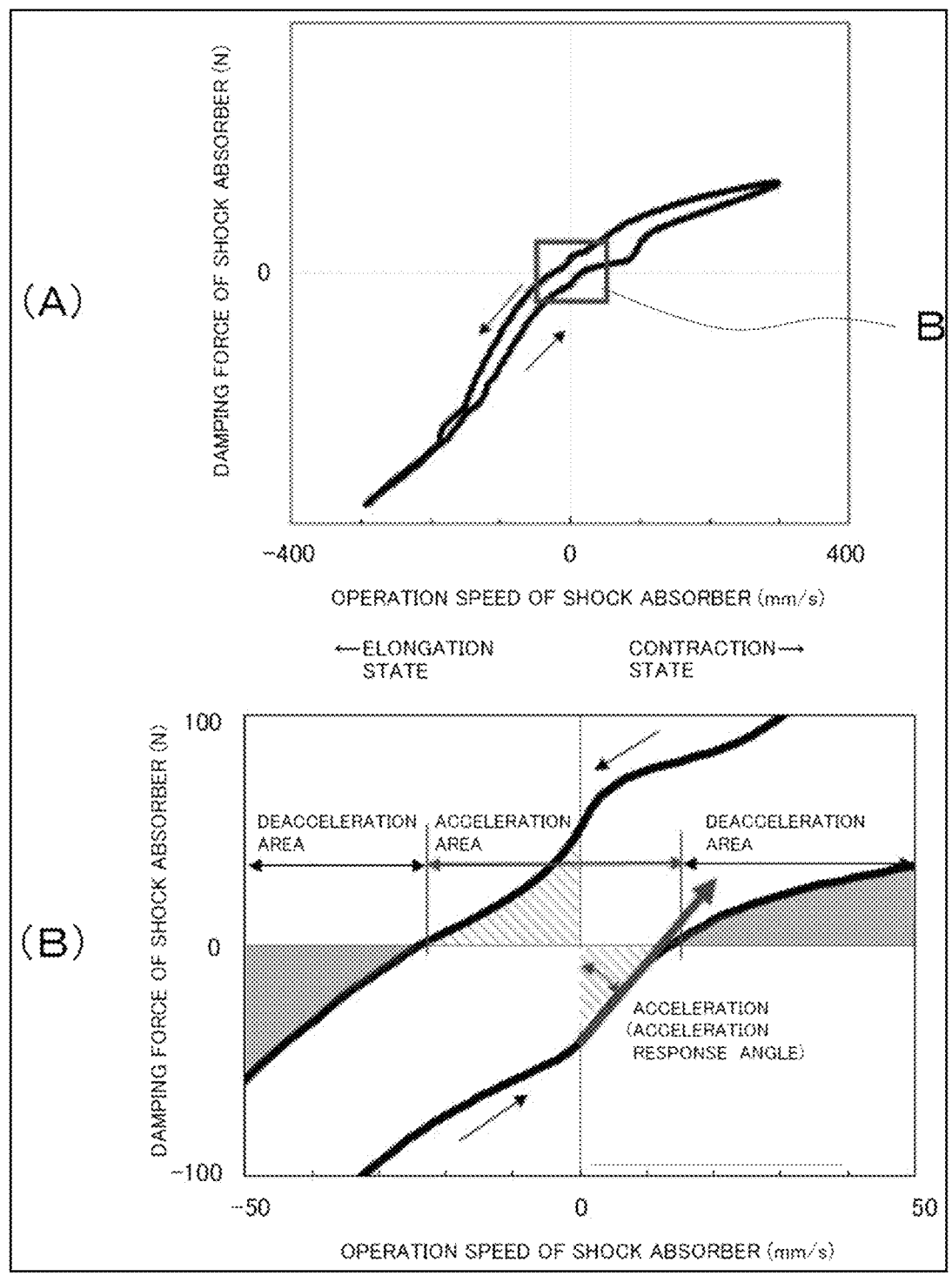

[Fig.5]
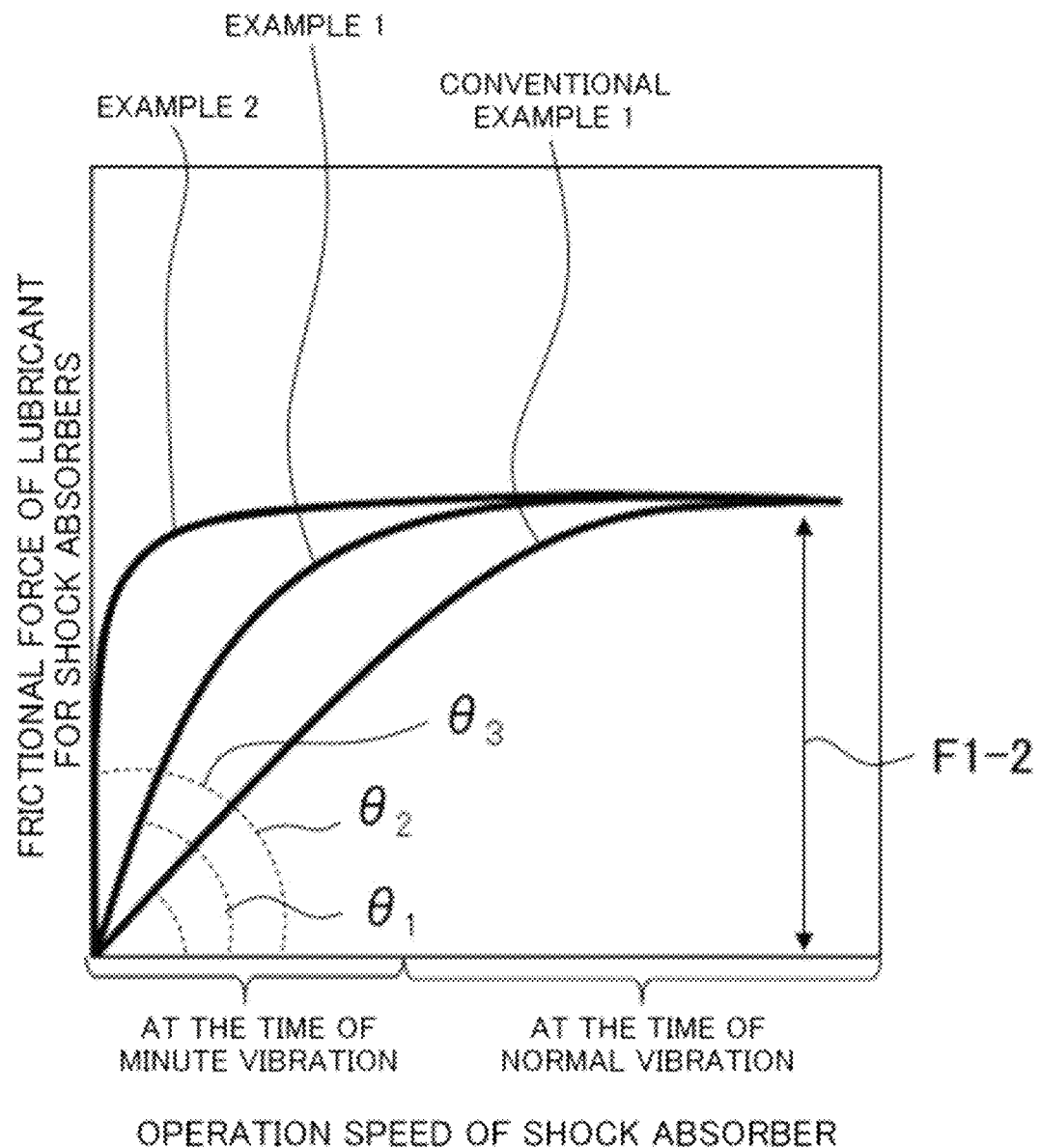

[Fig.6]
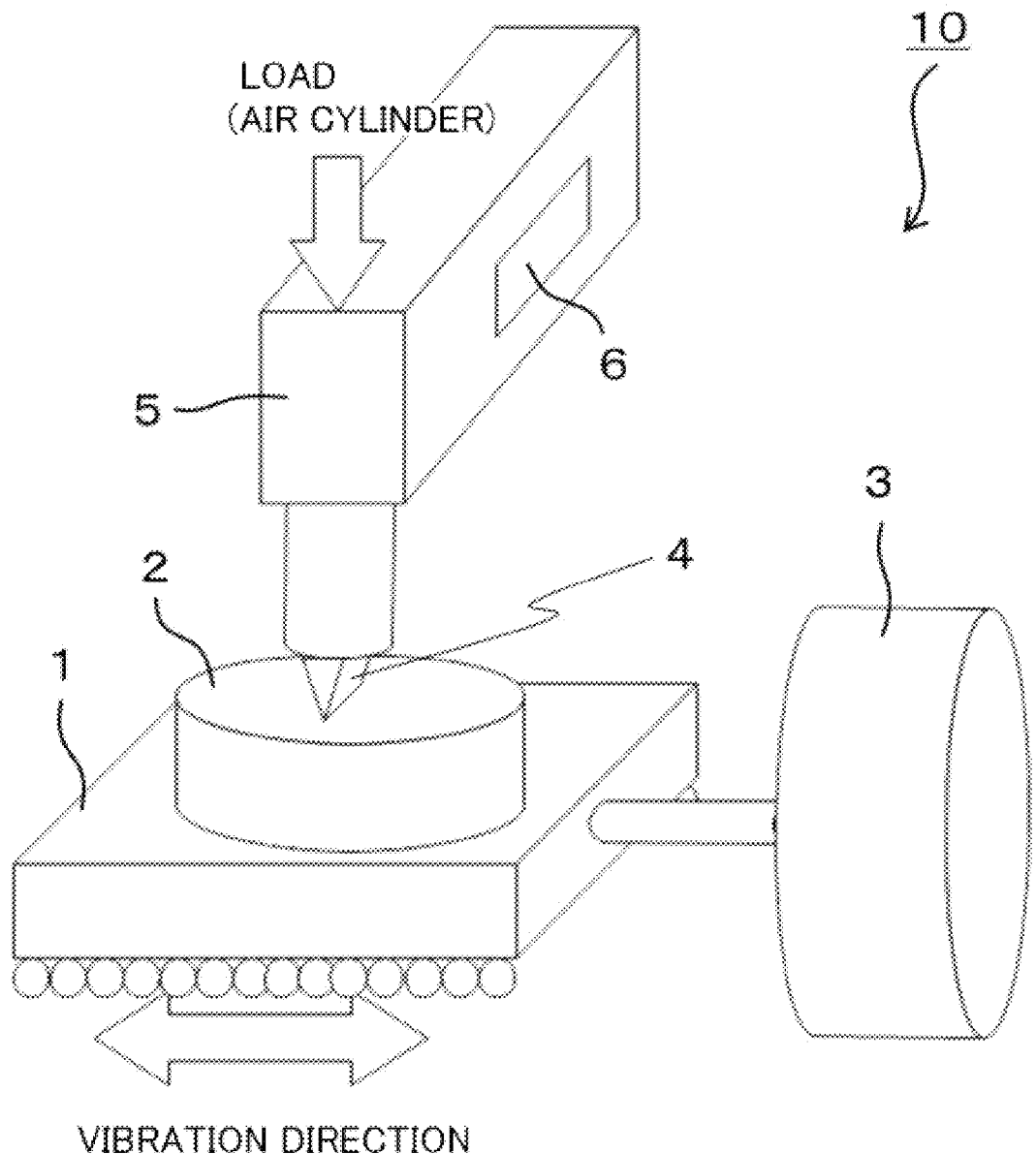

[Fig.7]
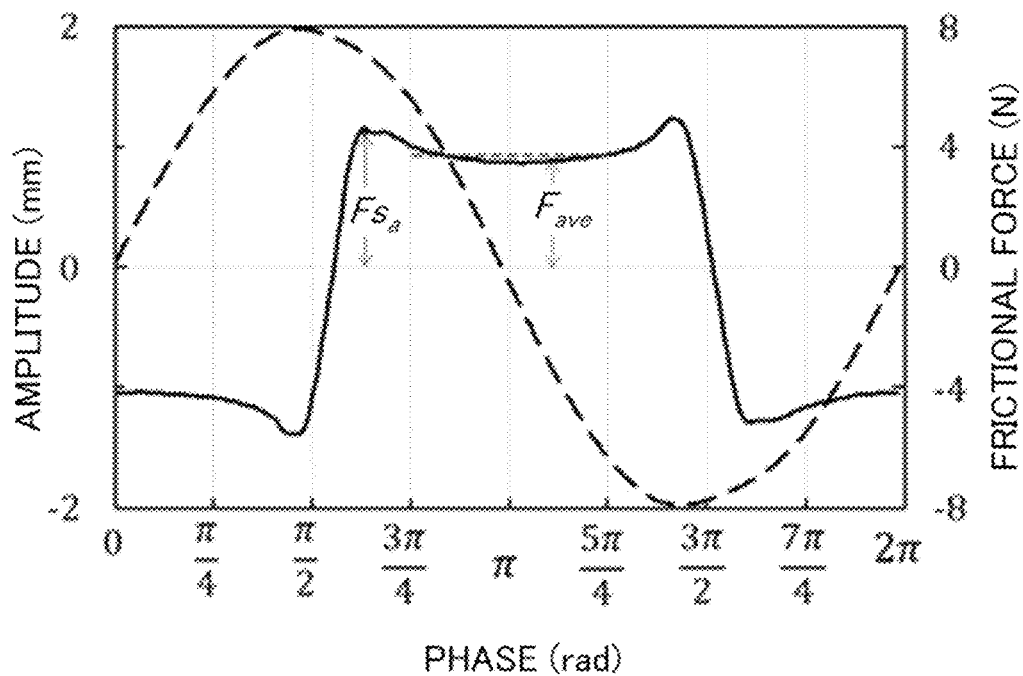

[Fig.8]
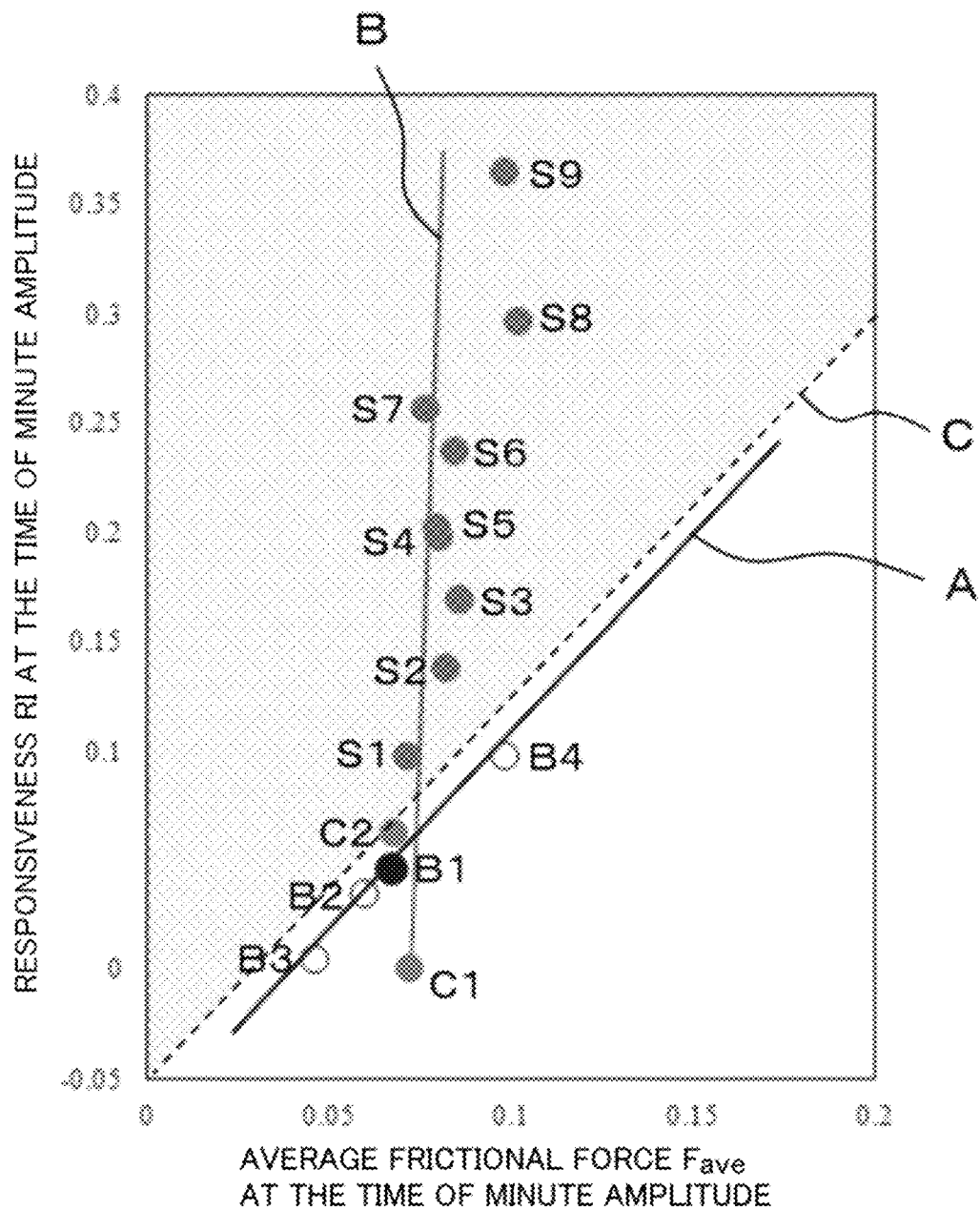

[Fig.9]
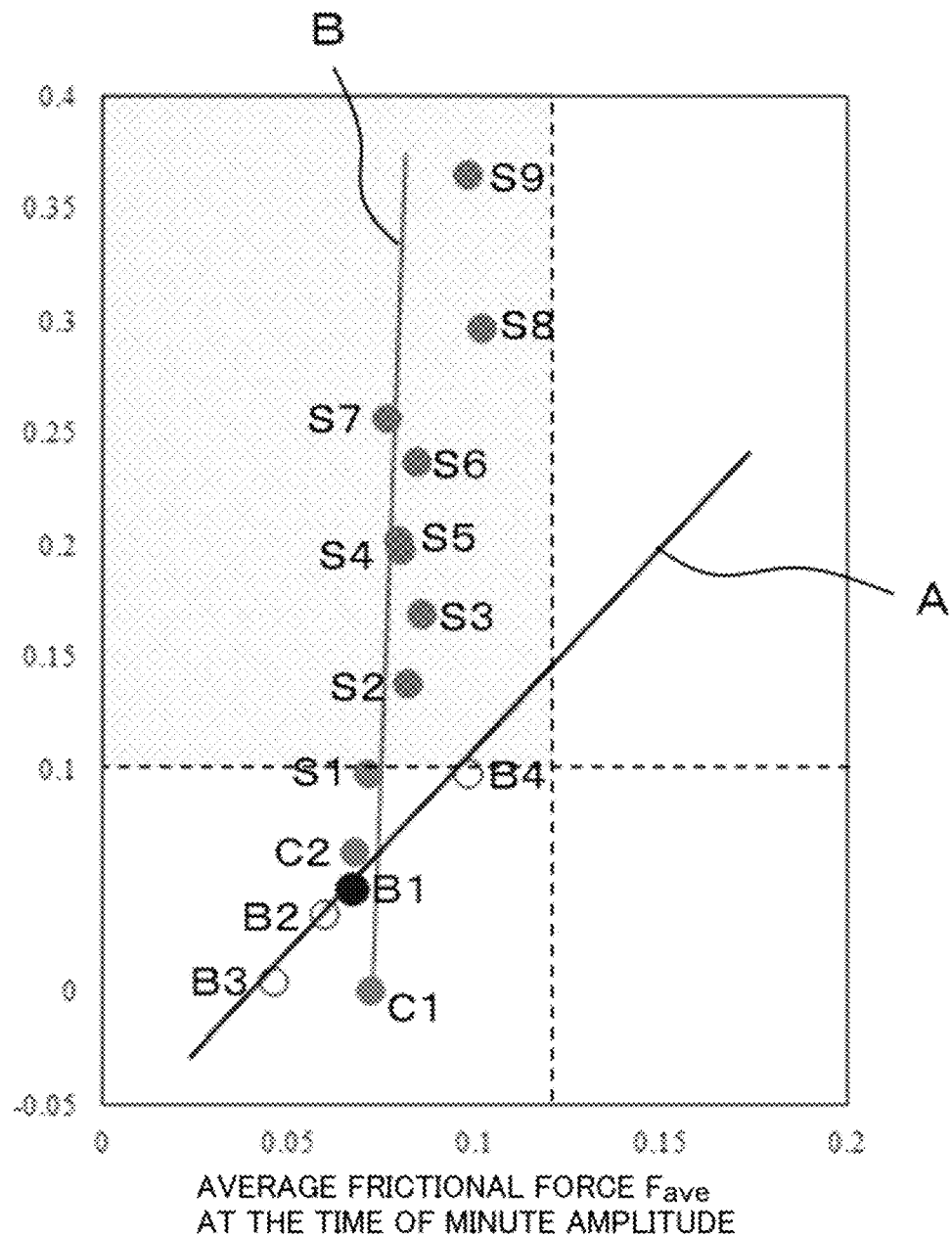

SHOCK ABSORBER LUBRICANT COMPOSITION, SHOCK ABSORBER, AND METHOD FOR ADJUSTING FRICTIONAL PROPERTY OF SHOCK ABSORBER LUBRICANT

This application is a 371 of PCT/JP2021/022675, filed Jun. 15, 2021.

TECHNICAL FIELD

The present invention relates to a lubricant composition for shock absorbers, a shock absorber, and a method of adjusting the frictional property of a lubricant for shock absorbers.

BACKGROUND ART

It is conventionally known that the vibration damping force of a shock absorber is the sum of a hydraulic damping force generated at a valve and a frictional force generated at a sliding part between a piston rod and an oil seal or between a piston and a cylinder. It is also known that when the vibration damping force of a shock absorber is large, steering stability increases but ride comfort worsens; conversely, when the vibration damping force of a shock absorber is small, steering stability worsens but ride comfort gets better. In recent years, therefore, studies have been made focusing on ride comfort to decrease the frictional force of a lubricant for shock absorbers and decrease the vibration damping force of a shock absorber by adjusting a friction adjusting agent to be added to the lubricant for shock absorbers (for example, Non-Patent Document 1).

PRIOR ART DOCUMENT

Non-Patent Document

Non-Patent Document 1: Technical Trends and Tribology of Shock Absorber (Hiroshi Nakanishi, Tribologist, 2009 (Vol. 54), No. 9, page 598).

SUMMARY

Technical Problem

Shock absorbers exhibit their vibration damping force by reciprocating motion. It takes a certain amount of time for their hydraulic damping force to start up, while a frictional force is highly responsive so that in transition from a stationary state to a sliding state or at the time of minute amplitude, the frictional force becomes an important factor of the vibration damping force of shock absorbers. A reduction in the frictional force of a lubricant for shock absorbers to give priority to ride comfort as in the past however leads to such problems as a decrease in vibration damping force and a deterioration in steering stability. Particularly in recent years, many roads are in good condition and vibrations with minute amplitude occur more than those with normal amplitude, so that there is a demand for the development of a lubricant composition for shock absorbers capable of satisfying both steering stability and ride comfort in transition from a stationary state to a sliding state or at the time of minute amplitude.

An object of the present invention is to provide a lubricant composition for shock absorbers, a shock absorber, and a method of adjusting the frictional property of a lubricant for shock absorbers, each capable of satisfying both steering stability and ride comfort.

Solution to Problem

An aspect of the present invention is the following lubricant composition for shock absorbers as described in (1) to (6).

(1) A lubricant composition for shock absorbers containing a base oil and pentaerythritol esters and having frictional property represented by the following formula (1):

$$RI > 1.75 \times F_{ave} - 0.05 \quad (1)$$

supposing that the responsiveness RI is a ratio ($\{F_{sa} - F_{ave}\}/F_{ave}$) of a difference between a peak frictional force $F_{sa}$ and an average frictional force $F_{ave}$ in transition from a stationary state to a sliding state at the time of minute amplitude to the average frictional force $F_{ave}$ at the time of minute amplitude.

(2) A lubricant composition for shock absorbers containing a base oil and pentaerythritol esters, wherein responsiveness RI which is a ratio ($\{F_{sa} - F_{ave}\}/F_{ave}$) of a difference between a peak frictional force $F_{sa}$ and an average frictional force $F_{ave}$ in transition from a stationary state to a sliding state at the time of minute amplitude to the average frictional force $F_{ave}$ at the time of minute amplitude is 0.1 or more and the average frictional force $F_{ave}$ at the time of minute amplitude is less than 0.12.

(3) The lubricant composition for shock absorbers as described above in (1) or (2), wherein a ratio ($RI/F_{ave}$) of the responsiveness RI to the average frictional force $F_{ave}$ at the time of minute amplitude is 2.0 or more.

(4) The lubricant composition for shock absorbers as described above in (3), wherein the responsiveness RI is 0.15 or more.

(5) The lubricant composition for shock absorbers as described above in any of (1) to (4), wherein a pentaerythritol tetraester and a pentaerythritol ester other than the pentaerythritol tetraester are contained as the pentaerythritol esters.

(6) The lubricant composition for shock absorbers as described above in any of (1) to (5), wherein a mixing ratio of the pentaerythritol tetraester in the pentaerythritol esters is 40% or more.

(7) The lubricant composition for shock absorbers as described above in (6), wherein the mixing ratio of the pentaerythritol tetraester in the pentaerythritol esters is 60% or more.

(8) The lubricant composition for shock absorbers as described above in any of (1) to (7), wherein only a pentaerythritol diester and a pentaerythritol tetraester are contained as the pentaerythritol esters.

(9) The lubricant composition for shock absorbers as described above in any of (1) to (8), wherein the pentaerythritol esters are contained in an amount of 5% or more.

Another aspect of the present invention is the following shock absorber as described in (10).

(10) A shock absorber containing the lubricant composition for shock absorbers as described above in any of (1) to (9).

A further aspect of the present invention is the following method of adjusting frictional property of a lubricant for shock absorbers as described in any of (11) to (13).

(11) A method of adjusting frictional property of a lubricant composition for shock absorbers containing a base oil and pentaerythritol esters, including the step of adjusting the frictional property of a lubricant composition for shock absorbers based on responsiveness RI and an average frictional force $F_{ave}$ at the time of minute amplitude so that the responsiveness RI relative to the average frictional force $F_{ave}$ is higher, supposing that a ratio ($\{F_{sa}-F_{ave}\}/F_{ave}$) of a difference between a peak frictional force $F_{sa}$ and the average frictional force $F_{ave}$ in transition from a stationary state to a sliding state at the time of minute amplitude to the average frictional force $F_{ave}$ at the time of minute amplitude.

(12) The adjusting method as described above in (11), wherein the frictional property of the lubricant composition for shock absorbers are adjusted by adding the pentaerythritol esters so that the lubricant composition for shock absorbers has frictional property represented by the following formula (2):

$$RI > 1.75 \times F_{ave} - 0.05 \quad (2).$$

(13) The adjusting method as described above in (11), wherein the frictional property of the lubricant composition for shock absorbers are adjusted by adding the pentaerythritol esters so that the responsiveness RI is 0.1 or more and the average frictional force $F_{ave}$ is less than 0.12.

Advantageous Effects of Invention

The present invention can provide a lubricant composition for shock absorbers, a lubricant additive, and a method of adjusting the frictional property of a lubricant for shock absorbers, each capable of satisfying both steering stability and ride comfort.

BRIEF DESCRIPTION OF DRAWINGS

FIG. 1 is a graph showing the measurement results of the respective percentages of hydraulic force and frictional force in damping force relative to an operation speed of a shock absorber.

FIGS. 2(A) and 2(B) are graphs respectively showing the operation speed and displacement of a shock absorber measured in a road test.

FIG. 3 is a view for explaining the relation, in conventional lubricants for shock absorbers, between the operation speed of a shock absorber and the frictional force of the lubricants for shock absorbers.

FIGS. 4(A) and 4(B) are views for explaining the spring property of a lubricant for shock absorbers.

FIG. 5 is a view for explaining the relation, in lubricants for shock absorbers intended by the present invention, between the operation speed of a shock absorber and the frictional force of the lubricants for shock absorbers.

FIG. 6 is a view for explaining a friction tester used in a friction test of lubricants for shock absorbers of the present embodiment.

FIG. 7 is a view showing the measurement results of the frictional force of a lubricant for shock absorbers by the friction tester shown in FIG. 6.

FIG. 8 is a graph showing the relation between the responsiveness RI of lubricants for shock absorbers and the average frictional force $F_{ave}$ at the time of minute amplitude.

FIG. 9 is a graph showing the relation between the responsiveness RI of lubricants for shock absorbers and the average frictional force $F_{ave}$ at the time of minute amplitude.

DESCRIPTION OF EMBODIMENTS

Embodiments of the lubricant composition for shock absorbers, shock absorber, and method of adjusting the frictional property of a lubricant for shock absorbers according to the present invention will hereinafter be described using a lubricant for shock absorbers as an example. First, the relation among a damping force of a shock absorber, a hydraulic force, and a frictional force will hereinafter be described.

A shock absorber is a device generating a damping force by the motion of a piston rod while using a lubricant which passes through a valve attached to a piston and it has an influence mainly on the stability and ride comfort of a vehicle. The damping force of a shock absorber is comprised of a hydraulic force generated by a pressure change during the passage of a lubricant for shock absorbers through a valve and a frictional force generated between the lubricant for shock absorbers and members of a piston (oil seal, rod guide, piston band, and the like).

The relation between the hydraulic force and frictional force of a lubricant for shock absorbers which comprise the damping force of a shock absorber was studied and found to have the relation as follows. Described specifically, a valve was removed from a shock absorber to prepare a valveless shock absorber not generating a hydraulic force but exerting only a frictional force. In a conventional shock absorber (shock absorber having a valve and generating both a hydraulic force and a frictional force) and the valveless shock absorber (shock absorber generating only a frictional force), a damping force was measured at each operation speed of the shock absorbers and the respective percentages of a hydraulic force and a frictional force exerted at each operation speed (piston speed) of the shock absorbers was measured. FIG. 1 is a graph showing the measurement results and it shows the respective percentages of the hydraulic force and frictional force at each operation speed of a shock absorber. As is apparent from FIG. 1, in an ultralow rate region in which the operation speed of a shock absorber was 30 mm/s or lower, the percentage of the frictional force in the damping force was high, while in a normal rate region in which the operation speed of a shock absorber was higher than 30 mm/s, the percentage of the hydraulic force in the damping force was high.

Lubricants for shock absorbers have conventionally been developed to have a certain level of ride comfort even on a rough road by having a small frictional force at the time of normal vibration at which an impact input from the outside is large (for example, at the time of normal vibration at which the operation speed of a shock absorber is higher than 30 mm/s) so that a damping force at the time of normal vibration increases. In recent years, however, a road condition has been improved and the occurrence frequency of normal vibration at which the operation speed of a shock absorber is higher than 30 mm/s has decreased. For example, a road test was conducted at 60 km/hour with a passenger vehicle with 1.8 L emissions in a test course that reproduced a road surface as rough as that of a national road. With a displacement sensor attached in parallel to a shock absorber, displacement of the shock absorber was measured at an interval of 2 kHz and the frequency distribution of the operation speed and displacement of a shock absorber was calculated. As a result, as shown in FIG. 2(A), the operation speed of a shock absorber was +30 mm/s or less at a frequency of 50% or more and the most frequent rate was +10 mm/s or less. As shown in FIG. 2(B), the amplitude of a shock absorber was +1.5 mm or less at a frequency of at least 50%. In the present invention, vibration at which a shock absorber has an operation speed of 30 mm/s or less or that having an amplitude of 2.0 mm or less is called "minute vibration", while vibration at which a piston rate is higher than +30 mm/s and having an amplitude greater than +2.0 mm is called "normal vibration".

Thus, when a vehicle travels on a road in a good road condition, minute vibration at which the operation speed of a shock absorber is +30 mm/s or less or an amplitude thereof is +2.0 mm or less occurs with high frequency as shown in FIGS. 2(A) and 2(B). At the time of minute vibration, as shown in FIG. 1, most of the damping force comprises a frictional force so that it becomes important to adjust the frictional force at the time of minute vibration. More specifically, since the minute vibration is minute vibration with less bodily sensation (less influence on ride comfort), it is more preferred at the time of minute vibration to increase the frictional force than to decrease the frictional force in order to enhance the steering stability. The conventional lubricant for shock absorbers is however designed to have a decreased frictional force at the time of normal vibration, paying attention to the ride comfort at the time of normal vibration. As a result, it has such a drawback that the frictional force at the time of minute vibration also decreases. In the conventional lubricant for shock absorbers, as shown in FIG. 3, this is because with a decrease in frictional force at the time of normal vibration (average frictional force at the time of normal vibration), the frictional force at the time of minute amplitude (average frictional force at the time of minute vibration) tends to be smaller. For example, as shown in the example of FIG. 3, the average frictional force F1-2 of the lubricant for shock absorber in Conventional Example 1 at the time of normal vibration is smaller than the average frictional force F2-2 or 3-2 of the lubricant for shock absorbers in Conventional Example 2 or 3 at the time of normal vibration so that the average frictional force F1-1 of Conventional Example 1 at the time of minute vibration is smaller than the average frictional force F2-1 or 3-1 of Conventional Example 2 or 3 at the time of minute vibration. On the contrary, when a lubricant for shock absorbers having a large frictional force at the time of minute amplitude is used (for example, a lubricant for shock absorber of Conventional Example 3 shown in FIG. 3 is used) in order to enhance the steering stability at the time of minute vibration, the frictional force at the time of minute vibration increases and the steering stability is enhanced, but there occurs a problem such as worsening of ride comfort due to an increase in the frictional force at the time of normal vibration.

It has been found out that the lubricant for shock absorbers has elongation/contraction properties and when the operation direction of a shock absorber changes and a contraction state turns to an elongation state or an elongation state turns to a contraction state, a force acting like a spring is generated and adds vibration to the shock absorber. For example, in FIG. 4(A), the measurement results of the damping force of a shock absorber which varies depending on the operation speed of the shock absorber are shown as a Lissajous figure. FIG. 4(B) is an enlarged view of the portion B of FIG. 4(A). In general, when the operation speed of a shock absorber (or vibration input into a shock absorber) is zero, the shock absorber does not generate a damping force so that the damping force of the shock absorber is zero. The damping force of a shock absorber however has a hysteresis as shown in FIG. 4(A) and as shown in FIG. 4(B), the damping force does not become zero even at the timing when the operation speed of a shock absorber becomes zero. This is presumed to occur because due to spring (oil stiffness and bubbles in the lubricant) action, a force in a direction accelerating the vibration of a shock absorber (force in a direction opposite to the damping force) is generated even when the operation speed of a shock absorber is zero. As shown in FIG. 4(A), such spring action of a lubricant for shock absorbers becomes larger at the time of minute vibration than at the time of normal vibration so that it becomes important to suppress, at the time of minute vibration, a force (force in a direction opposite to that of a damping force) caused by the spring property of the lubricant for shock absorbers by the frictional force of the lubricant for shock absorbers. More specifically, it is important for a lubricant for shock absorbers to exert a sufficient frictional force at the time of minute vibration so that an acceleration area (area where a damping force acceleratingly changes) indicated by shaded lines in FIG. 4(B) decreases or acceleration increases (an acceleration response angle decreases).

With a view to satisfying both steering stability and ride comfort, an object of the present invention is therefore to provide a lubricant composition for shock absorbers capable of increasing the frictional force at the time of minute vibration without increasing the frictional force at the time of normal vibration. Described specifically, the object is to provide a lubricant composition for shock absorbers, like the lubricant for shock absorbers in Example 1 or 2 shown in FIG. 5, in which an increasing ratio θ (a ratio (ΔF/ΔV) of the amount ΔF of change in the frictional force of the lubricant for shock absorbers to the amount ΔV of change in the operation speed of a shock absorber) of a frictional force at the time of minute vibration is higher than that of a conventional lubricant for shock absorbers (Conventional Example 1) even when it has a frictional force at the time of normal vibration on the same level as that of the conventional lubricant for shock absorbers in Conventional Example 1. In other words, the object is to provide a lubricant composition for shock absorbers in which an increasing ratio θ of a frictional force at the time of minute vibration is high relative to an average frictional force at the time of minute vibration, because a lubricant for shock absorbers tends to have a larger average frictional force at the time of normal vibration with an increase in average frictional force at the time of minute vibration. FIG. 3 is a view for explaining the relation, in conventional lubricants for shock absorbers, between the operation speed of a shock absorber and the frictional force of the lubricants for shock absorbers and FIG. 5 is a view for explaining the relation, in a lubricant for shock absorbers intended by the present invention, between the operation speed of a shock absorber and the frictional force of the lubricant for shock absorbers. A lubricant for shock absorbers having such frictional property will hereinafter be described.

The lubricant for shock absorbers according to the present embodiment has (A) a base oil and (B) a friction adjusting agent and the friction adjusting agent (B) contains (B1) zinc dithiophosphate (which may hereinafter be called "ZnDTP") and (B2) pentaerythritol.

(A) Base Oil

The base oil in the lubricant for shock absorbers according to the present embodiment is a mineral oil and/or a synthetic oil. The kind of the mineral oil or synthetic oil is not particularly limited. Examples of the mineral oil include paraffinic mineral oils, intermediate-based mineral oils, and naphthenic mineral oils obtained by a conventional refining method such as solvent refining or hydrotreating. Examples of the synthetic oil include polybutenes, polyolefins [α-olefin (co)polymers], various esters (such as polyol esters, dibasic acid esters, and phosphoric acid esters), various ethers (such as polyphenyl ether), alkylbenzenes, and alkylnaphthalenes. In the present invention, as the base oil, the above-described mineral oils may be used alone or in combination of two or more; the above-described synthetic oils may be used alone or in combination of two or more; or one or more of the mineral oils may be used in combination with one or more of the synthetic oils.

(B) Friction Adjusting Agent

The lubricant for shock absorbers according to the present embodiment contains a friction adjusting agent. Although the friction adjusting agent is not particularly limited, it may contain a friction adjusting agent such as phosphorus-, amine-, or ester-based one. The friction coefficient of the lubricant for shock absorbers can be adjusted by adjusting an addition amount of the friction adjusting agent. The friction adjusting agent according to the present embodiment contains at least (B1) a zinc dithiophosphate and (B2) pentaerythritol esters as described below.

(B1) Zinc Dithiophosphate (ZnDTP)

A ZnDTP is typically a compound represented by the following Chemical formula 1 and it has a function of assisting the friction adjusting agent to adjust a friction coefficient.

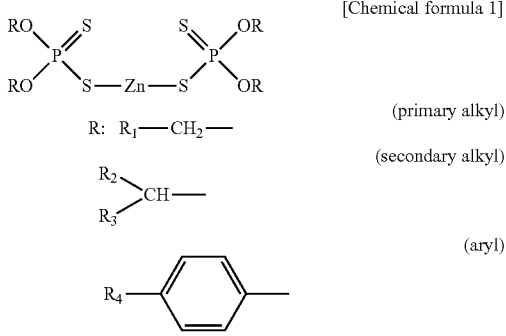

[Chemical formula 1]

[in the aforesaid Chemical formula 1, Rs are each independently a hydrocarbon group and examples include linear primary alkyl groups, branched secondary alkyl groups, and aryl groups].

Although a plurality of kinds (structures) of ZnDTPs such as that having a primary alkyl group, that having a secondary alkyl group, and that having an aryl group are known, the lubricant for shock absorbers according to the present embodiment contains two kinds of ZnDTP as described below.

Described specifically, the lubricant for shock absorbers according to the present embodiment contains, as a first ZnDTP, a ZnDTP represented by the following Chemical formula 2:

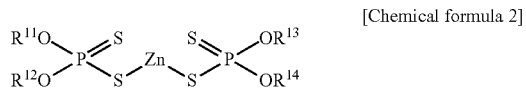

[Chemical formula 2]

[in the aforesaid Chemical formula 2, $R^{11}$ to $R^{14}$ are alkyl groups and these alkyl groups include a primary alkyl group and a secondary alkyl group. This means that one or more and three or less of $R^{11}$ to $R^{14}$ is/are a primary alkyl group and the other(s) of $R^{11}$ to $R^{14}$ is/are a secondary alkyl group].

The primary alkyl group of the first ZnDTP is not particularly limited. Examples include methyl, ethyl, n-propyl, n-butyl, n-pentyl, n-hexyl, n-heptyl, n-octyl, n-nonyl, n-decyl, isoamyl, isobutyl, 2-methylbutyl, 2-ethylhexyl, 2,3-dimethylbutyl, and 2-methylpentyl groups, with an alkyl group having from 4 to 12 carbon atoms (such as isobutyl group (having 4 carbon atoms) and 2-ethylhexyl group (having 8 carbon atoms)) being preferred.

The secondary alkyl group of the first ZnDTP is not particularly limited. Examples include isopropyl, sec-butyl, 1-ethylpropyl, 2-ethylhexyl, and 4-methyl-2-pentyl groups, with an alkyl group having 3 to 6 carbon atoms (such as isopropyl group (having 3 carbon atoms)) being preferred.

Although a ratio of the primary alkyl group and the secondary alkyl group in the first ZnDTP is not particularly limited, a ratio of the primary alkyl group is preferably higher than a ratio of the secondary alkyl group.

Although the content of the first ZnDTP is not particularly limited, the content of it in the lubricant for shock absorbers is preferably 0.1 mass % or more, more preferably 0.4 mass % or more. In addition, the content of the first ZnDTP in the lubricant for shock absorbers is preferably 4.0 mass % or less, more preferably 2.0 mass % or less.

Thus, the lubricant for shock absorbers according to the present embodiment includes therein the first ZnDTP having both the primary alkyl group and the secondary alkyl group. Thereby, a friction coefficient of the lubricant for shock absorbers can easily be adjusted to be suited for good ride comfort and steering stability when the friction adjusting agent is added. In addition, it can suppress variation in friction coefficient and provide more improved ride comfort compared with a lubricant for shock absorbers including a ZnDTP having only a primary alkyl group and/or a ZnDTP having only a secondary alkyl group.

Further, the lubricant for shock absorbers according to the present embodiment has, as a friction adjusting agent, a second ZnDTP having a structure different from that of the first ZnDTP. The second ZnDTP is represented by the following Chemical formula 3:

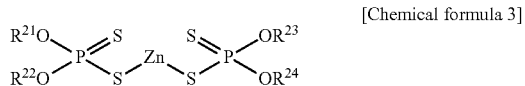

[Chemical formula 3]

[in the aforesaid Chemical formula 3, $R^{21}$ to $R^{24}$ are each a secondary alkyl group, meaning that the second ZnDTP does not have a primary alkyl group but has only a secondary alkyl group].

The number of carbon atoms of the secondary alkyl group which the second ZnDTP has is not particularly limited and examples of the secondary alkyl group include isopropyl, sec-butyl, 1-ethylpropyl, 2-ethylhexyl, and 4-methyl-2-pentyl groups. The secondary alkyl group is preferably an alkyl group having 3 to 8 carbon atoms (for example, an isopropyl group (having 3 carbon atoms), a 2-ethylhexyl group (having 8 carbon atoms), or an isobutyl group (having 4 carbon atoms)).

Although the content of the second ZnDTP is not particularly limited, it is preferably smaller than that of the first ZnDTP. It is preferably 20 wt % or less of the addition amount of ZnDTPs (a total amount of the first ZnDTP and the second ZnDTP).

The kind of the alkyl group contained in the ZnDTP can be determined by a known measurement method. For example, the structure of the ZnDTP can be determined using $C^{13}$-NMR or by analyzing whether the alkyl group is a primary alkyl group or a secondary alkyl group based on the characteristics of a P-O-C absorption band or P=S and P-S absorption bands by using the fingerprint region of FT-IR.

The friction adjusting agent containing, as the dithiophosphoric acid (B1), a second ZnDTP having only the secondary alkyl group can provide more improved ride comfort compared with that containing only the first ZnDTP. More specifically, it can reduce the microvibration during running compared with that containing only the first ZnDTP. Further, by using, as the second ZnDTP, a ZnDTP having a secondary alkyl group with 3 to 8 carbon atoms, a difference in friction coefficient between minute amplitude (low speed) and normal amplitude (high speed) can be reduced and improved ride comfort can be provided.

(B2) Pentaerythritol Esters

Pentaerythritol esters are each a tetravalent sugar alcohol and a compound in which a hydroxyl group, which is a terminal substituent of pentaerythritol, is ester bonded to a fatty acid residue. The pentaerythritol esters includes a pentaerythritol tetraester in which all four terminal substituents are ester bonded to a fatty acid residue and partial esters, that is, pentaerythritol monoester, pentaerythritol diester, and pentaerythritol triester in which any of terminal substituents are ester bonded to a fatty acid residue. In the following description, a pentaerythritol tetraester, a pentaerythritol triester, a pentaerythritol diester, and a pentaerythritol monoester will be abbreviated as PE4E, PE3E, PE2E, and PE1E, respectively.

In the pentaerythritol esters of the present embodiment, the fatty acid residue is not particularly limited and examples include $C_6$ to $C_{22}$ fatty acid residues such as stearic acid residue and oleic acid residue. As examples of the fatty acid residue, caprylic acid, capric acid, oleic acid, stearic acid, myristic acid, palmitic acid, linoleic acid, adipic acid, pelargonic acid, tall oil fatty acid, palm fatty acid, coconut fatty acid, and beef tallow fatty acid can be given.

In the lubricant for shock absorbers according to the present embodiment, the pentaerythritol esters (B2) contain (b21) PE4E and (b22) a pentaerythritol ester other than PE4E, that is, PE3E, PE2E, or PE1E. In the following description, PE2E will be used as the pentaerythritol ester other than EP4E (b22), but the pentaerythritol ester other than PE4E is not limited to PE2E and it may be PE3E or PE1E. As the pentaerythritol ester other than PE4E, a mixture pf PE3E and PE2E, a mixture of PE3E and PE1E, a mixture of PE2E and PE1E, or a mixture of PE3E, PE2E, and PE1E may be used.

As for the preparation of PE4E, it is technically difficult to prepare only PE4E and PE1E, PE2E, and/or PE3E may inevitably be mixed in PE4E. A product commercially available as "pentaerythritol tetraester" is therefore not composed only of PE4E, but it mainly contains PE4E and contains, in addition to PE4E, PE3E, PE2E, or PE1E. The "pentaerythritol tetraester" of the present invention may be a mixture of pentaerythritol esters commercially available as "pentaerythritol tetraester" or a mixture of pentaerythritol esters containing 80% or more of "pentaerythritol tetraester". For the same reason, the "pentaerythritol diester" of the present invention may be a mixture of pentaerythritol esters commercially available as "pentaerythritol diester" or a mixture of pentaerythritol esters containing 80% or more of "pentaerythritol diester". This may also be applied to PE1E and PE3E.

(Frictional Property of a Lubricant for Shock Absorbers)

The lubricant composition for shock absorbers according to the present invention is, as described above, a lubricant composition for shock absorbers capable of exerting a high frictional force even when minute vibration (which does not affect the ride comfort) with less bodily sensation is input and at the same time, suppressing a frictional force when normal vibration (which affects the ride comfort) with large bodily sensation is input and thereby satisfying both steering stability and ride comfort. Such a lubricant composition for shock absorbers is, like the lubricant for shock absorbers in Examples 1 and 2 shown in FIG. 5, characterized by that a ratio ($\Delta F/\Delta V$), at the time of minute vibration, of the amount $\Delta F$ of change in the frictional force of the lubricant for shock absorbers to the amount $\Delta V$ of change in the operation speed rate of a shock absorber is higher than that of the conventional lubricant for shock absorbers (Conventional Example 1) without increasing the average frictional force F1-2 at the time of normal vibration.

In the present embodiment, a lubricant for shock absorbers having such frictional property is defined based on a peak frictional force $F_{sa}$ at the time of minute amplitude and an average frictional force $F_{ave}$ at the time of minute amplitude.

Here, the peak value $F_{sa}$ and the average frictional force $F_{ave}$ at the time of minute amplitude can be measured using, for example, a friction tester 10 shown in FIG. 6. FIG. 6 is a schematic view of the friction tester 10 of the present embodiment. As shown in FIG. 6, the friction tester 10 is a pin-on-disk friction tester and it measures a frictional force, which is generated by reciprocating a disk specimen 2 fixed on a slide bearing 1 by an electromagnetic exciter 3 and sliding the disk specimen while pressing a pin specimen 4 against it, by means of a strain gauge 6 attached to a fixing shaft 5 of the pin specimen 4. A combination of a lubricant for shock absorbers and an oil seal serves as a factor that affects the frictional property of a shock absorber so that in the friction tester 10 shown in FIG. 6, an acrylonitrile butadiene rubber (NBR) to be used as an oil seal in a shock absorber is used as the pin specimen 4 and the pin specimen 4 is cut at the tip thereof to have an angle of 140° and resemble an oil lip. For the disk specimen 2, a hard chrome plated film to be applied to the surface of a piston rod is used. In the example shown in FIG. 6, a frictional force between the NBR pin specimen 4 and the chrome plated disk specimen 2 is measured, but the frictional force between a copper ball and the chrome plated disk specimen 2 may be measured.

FIG. 7 shows the results of measuring the frictional force of a lubricant for shock absorbers with the aforesaid friction tester 10 by reciprocating the pin specimen 4 and the disk specimen 2 at an amplitude of 2.0 mm, frequency of 1.5 Hz, a load of 20 N, and a temperature of 30° C. FIG. 7 shows reversal of the operation direction of the pin specimen 4 and the disk specimen 2 in the $\pi/2$ and $\pi/2$ phases. In the example shown in FIG. 7, due to the reversal of the operation direction of the pin specimen 4 and the disk specimen 2, they are temporarily in a stationary state at the timing of $\pi/2$ and $\pi/2$ and immediately after that, transition from a stationary state to a sliding state occurs. The lubricant composition for shock absorbers according to the present embodiment contains pentaerythritol esters so that it has, as the frictional property, a peak frictional force in transition from a stationary state to a sliding state as shown in FIG. 7. Thus, using the friction tester 10 makes it possible to measure the peak frictional force $F_{sa}$ in transition from a stationary state to sliding state and the average frictional force $F_{ave}$ in a sliding state at the time of minute vibration.

Further, in the present embodiment, a ratio of a difference, at the time of minute amplitude, between a peak frictional force $F_{sa}$ in transition from a stationary state to a sliding state and an average frictional force $F_{ave}$ to the average frictional force $F_{ave}$ at the time of minute amplitude is defined as responsiveness RI of a lubricant for shock absorbers, as shown in the following formula (3):

$$RI=(F_{sa}-F_{ave})/F_{ave} \quad (3)$$

The lubricant for shock absorbers according to the present embodiment is characterized by having, as frictional property, the relation represented by the following formula (4):

$$RI>1.75\times F_{ave}-0.05 \quad (4)$$

between responsiveness RI of the lubricant for shock absorbers at the time of minute amplitude and an average frictional force $F_{ave}$ at the time of minute amplitude.

FIG. 8 is a graph showing the relation between responsiveness RI at the time of minute amplitude and an average frictional force $F_{ave}$ at the time of minute amplitude in lubricant compositions (Conventional Examples B1 to B4 and Comparative Examples C1 and C2) for shock absorbers not included in the present embodiment and lubricant compositions (Examples S1 to S9) for shock absorbers according to the present embodiment. In this graph, the responsiveness RI at the time of minute amplitude is plotted along the ordinate and the average frictional force $F_{ave}$ at the time of minute amplitude is plotted along the abscissa. In FIG. 8, the frictional property of the conventional lubricants (B1 to B4) for shock absorbers are indicated as a straight line A and the frictional property of the lubricants (S1 to S9) for shock absorbers according to the present embodiment are indicated as a straight line B. A line representing the aforesaid formula (4): RI=1.75×$F_{ave}$−0.05 is indicated as a straight line C. The lubricants for shock absorbers according to the present embodiment have frictional property as represented by RI>1.75×$F_{ave}$−0.05 and in FIG. 8, lubricants for shock absorbers plotted in a shaded area above the straight line C correspond to such lubricants.

In FIG. 8, the frictional property of a lubricant for shock absorbers composed only of a base oil are shown by Conventional Example B1. Further, lubricants for shock absorbers containing, as pentaerythritol esters, a pentaerythritol diester and/or a pentaerythritol tetraester are shown as Comparative Examples C1 and C2 and Examples S1 to S9. More specifically, a lubricant for shock absorbers having, as pentaerythritol esters, only a pentaerythritol diester is shown as Comparative Example C1 and a lubricant for shock absorbers obtained by adding, as pentaerythritol esters, 80% of a pentaerythritol diester and 20% of a pentaerythritol tetraester is shown as Comparative Example C2. Similarly, lubricants for shock absorbers obtained by adding a pentaerythritol diester and a pentaerythritol tetraester so that the contents of the pentaerythritol tetraester in the pentaerythritol esters be 40%, 60%, 70%, 75%, 80%, 85%, 90%, 95%, and 100% are shown as Examples S1 to S9, respectively.

As shown in FIG. 8, compared with the conventional lubricants B1 to B4 for shock absorbers, the lubricants (Examples S1 to S9) for shock absorbers according to the present embodiment are lubricants for shock absorbers having high responsiveness RI at the time of minute amplitude relative to the average frictional force $F_{ave}$ at the time of minute amplitude. Since these lubricants have high responsiveness RI at the time of minute amplitude, a high frictional force can be achieved even at the time of minute amplitude and the steering stability at the time of minute amplitude can be enhanced and in addition, since they have a low average frictional force $F_{ave}$ at the time of minute amplitude, the average frictional force at the time of normal amplitude tends to be suppressed to low and ride comfort can be improved. In addition, as in Examples S1 to S9 shown in FIG. 8, by adjusting the contents of the pentaerythritol diester and the pentaerythritol tetraester in the pentaerythritol esters, responsiveness RI at the time of minute amplitude can be adjusted, making it possible to adjust the frictional property to satisfy the intended use or need of a shock absorber. It is to be noted that the lubricants for shock absorbers may have another constitution in which responsiveness RI at the time of minute amplitude is adjusted by adding a friction adjusting agent other than the pentaerythritol esters.

In the lubricant for shock absorbers according to the present embodiment, responsiveness RI relative to an average frictional force $F_{ave}$ at the time of minute amplitude is preferably set higher and in addition to the frictional property represented by the aforesaid formula (4), a ratio (RI/$F_{ave}$) of responsiveness RI at the time of minute amplitude to an average frictional force $F_{ave}$ at the time of minute amplitude is preferably set at 2.0 or more, more preferably 2.5 or more.

Further, although the lubricants (Examples S1 to S9) for shock absorbers according to the present embodiment are not particularly limited as long as they have the frictional property represented by the aforesaid formula (4), the responsiveness RI at the time of minute amplitude is preferably 0.10 or more, more preferably 0.15 or more, still more preferably 0.20 or more. This is because the responsiveness RI at the time of minute amplitude contributes to the steering stability at the time of minute amplitude and with an increase in the peak frictional force $F_{sa}$ in transition from a stationary state to a sliding state, the frictional force at the time of minute amplitude is enhanced and the steering stability at the time of minute amplitude increases.

In addition, as shown in FIG. 8, the lubricant for shock absorbers according to the present embodiment has preferably an average frictional force $F_{ave}$ of less than 0.12 at the time of minute amplitude. This is because as described above, the lubricant for shock absorbers in which the average frictional force $F_{ave}$ at the time of minute vibration is large tends to have a large average frictional force at the time of normal vibration and when the average frictional force at the time of normal amplitude increases, the ride comfort may be damaged.

As described above, the lubricant for shock absorbers according to the present embodiment contains, as a friction adjusting agent, the pentaerythritol esters (B2) and supposing that a ratio ({$F_{sa}$−$F_{ave}$}/$F_{ave}$) of a difference, at the time of minute amplitude, between a peak frictional force $F_{sa}$ in transition from a stationary state to a sliding state and an average frictional force $F_{ave}$ to the average frictional force $F_{ave}$ at the time of minute amplitude is responsiveness RI, the lubricant for shock absorbers has the frictional property represented by the aforesaid formula (4): RI>1.75×$F_{ave}$−0.05. The lubricant for shock absorbers according to the present embodiment has high responsiveness RI at the time of minute amplitude so that it has a high frictional force at the time of minute amplitude and therefore has high steering stability and at the same time, it has a low average frictional force $F_{ave}$ at the time of minute amplitude and therefore the average frictional force at the time of normal amplitude tends to be suppressed to low and enhanced ride comfort can be achieved. Thus, a lubricant composition capable of satisfying both steering stability and ride comfort can be provided.

Preferred embodiment examples of the present invention were described above, but the technical scope of the present invention is not limited to or by the description of the aforesaid embodiments. Various modifications or improvements may be added to the aforesaid embodiment examples and embodiment to which such modifications or improvements have been added are also embraced in the technical scope of the present invention.

For example, the constitution of the lubricant for shock absorber according to the aforesaid embodiments may be replaced by a constitution having such frictional property that responsiveness RI which is a ratio ($\{F_{sa}-F_{ave}\}/F_{ave}$) of a difference, at the time of minute amplitude, between a peak frictional force $F_{sa}$ in transition from a stationary state to a sliding state and an average frictional force $F_{ave}$ to the average frictional force $F_{ave}$ at the time of minute amplitude is 0.1 or more and the average frictional force $F_{ave}$ at the time of minute amplitude is less than 0.12. Here, FIG. 9 is, similar to FIG. 8, a graph showing the relation between responsiveness RI of a lubricant for shock absorbers and an average frictional force $F_{ave}$ at the time of minute amplitude and a lubricant for shock absorbers having such frictional property that the responsiveness RI at the time of minute amplitude is 0.1 or more and an average frictional force $F_{ave}$ at the time of minute amplitude is less than 0.12 is indicated by shading. Similar to the lubricant for shock absorbers according to the aforesaid embodiment, such a lubricant for shock absorbers has frictional property with high responsiveness RI at the time of minute amplitude while suppressing the average frictional force at the time of normal amplitude so that a sufficient frictional force can be achieved at the time of minute amplitude and therefore steering stability at the time of minute amplitude can be enhanced and at the same time, a frictional force at the time of normal amplitude can be suppressed and therefore ride comfort can be improved.

In addition to the aforesaid embodiments, the pentaerythritol esters of the lubricant composition may be "composed mainly of PE4E". The term "composed mainly of PE4E" as used herein means pentaerythritol esters containing PE1E, PE2E, PE3E, and/or PE4E and having the highest amount of PE4E; or pentaerythritol esters having a PE4E content of 50% or more. In preparing PE4E, it is technically difficult to prepare only PE4E and a product thus prepared contains PE1E, PE2E, and/or PE3E together. Therefore, actually, a commercially available "pentaerythritol tetraester" is not composed only of PE4E but it mainly contains PE4E and in addition thereto, it contains PE3E, PE2E, or even PE1E. It is therefore possible to define a pentaerythritol ester commercially available as "PE4E" as the pentaerythritol esters "composed mainly of PE4E" in the present invention.

The pentaerythritol esters "composed mainly of PE4E" can also be defined as follows. Described specifically, the number of the ester groups of pentaerythritol esters containing PE3E, PE2E, and PE1E, as well as PE4E is measured and pentaerythritol esters whose average number of the ester groups is more than 3 are specified as the pentaerythritol esters "composed mainly of PE4E". It is also possible to specify pentaerythritol esters, whose average number of hydroxyl groups is less than 1 as a result of the measurement of hydroxyl groups, as the pentaerythritol esters "composed mainly of PE4E". The average number of the ester groups or hydroxyl groups of pentaerythritol esters can be measured using, for example, gas chromatography mass analysis or liquid chromatography mass analysis.

Such pentaerythritol esters mainly contain hydroxyl-free PE4E but partially contain hydroxyl-containing PE3E, PE2E, and PE1E. The hydroxyl value of these hydroxyl-containing pentaerythritol is preferably 0.5 mgKOH/g or more, more preferably 1.0 mgKOH/g or more, still more preferably 1.5 mgKOH/g or more.

The lubricant for shock absorbers has improved abrasion resistance by adjusting the hydroxyl value thereof to 0.5 mgKOH/g or more and thereby suppressing the decomposition of pentaerythritol (deterioration of the lubricant for shock absorbers due to the decomposition of pentaerythritol). In particular, from the standpoint of suppressing the deterioration of a lubricant for shock absorbers, the hydroxyl value of the lubricant for shock absorbers is preferably 0.5 mgKOH/g or more, more preferably 1.0 mgKOH/g or more, still more preferably 1.5 mgKOH/g or more.

The lubricant for shock absorbers may have such a constitution that it contains 0.5 mass % or more, more preferably 1.0 mass % or more, of pentaerythritol esters. By adjusting the pentaerythritol ester content to 0.2 mass % or more, variation in friction coefficient of the ZnDTP-containing lubricant for shock absorbers can be suppressed. Considering the decomposition of the pentaerythritol esters, the pentaerythritol ester content may be set to 0.5 mass % or more, preferably 1.0 mass % or more.

The lubricant for shock absorbers is also preferred to have a constitution such that it has a pentaerythritol ester content of 2.0 mass % or more, because without the pentaerythritol esters, ZnDTP may decrease due to the decomposition or the like, which increases the friction coefficient of the lubricant for shock absorbers and causes wear. Thus, a lubricant for shock absorbers having a pentaerythritol ester content of 2.0 mass % or more can effectively suppress a decrease in ZnDTP and as a result, it can be suppressed from deterioration.

Further, a lubricant for shock absorbers has more preferably such a constitution that it has a pentaerythritol ester content of 5.0 mass % or more. The reason is as follows: the hydroxyl value of a lubricant for shock absorbers is preferably adjusted to 0.5 mgKOH/g or more to suppress the deterioration of the lubricant for shock absorbers, but since the pentaerythritol esters contained in the lubricant for shock absorbers are mainly a hydroxyl-free pentaerythritol tetraester, it is preferred to adjust the pentaerythritol ester content to 5 mass % or more to adjust the hydroxyl value of the lubricant for shock absorbers to 0.5 mgKOH/g or more.

The invention claimed is:

1. A lubricant composition for shock absorbers, comprising:
   a base oil, and
   pentaerythritol esters which comprise a pentaerythritol tetraester and a pentaerythritol ester other than the pentaerythritol tetraester,
   wherein a mixing ratio of the pentaerythritol tetraester in the pentaerythritol esters is 40% or more.

2. The lubricant composition for shock absorbers according to claim 1,
   wherein the lubricant composition satisfies the following requirement: responsiveness RI which is a ratio ($\{F_{sa}-F_{ave}\}/F_{ave}$) of a difference between a peak frictional force $F_{sa}$ and an average frictional force $F_{ave}$ in transition from a stationary state to a sliding state at the time of minute amplitude to the average frictional force $F_{ave}$ at the time of minute amplitude is 0.1 or more and the average frictional force $F_{ave}$ at the time of minute amplitude is less than 0.12.

3. The lubricant composition for shock absorbers according to claim 2, wherein a ratio ($RI/F_{ave}$) of the responsiveness RI to the average frictional force $F_{ave}$ at the time of minute amplitude is 2.0 or more.

4. The lubricant composition for shock absorbers according to claim 3, wherein the responsiveness RI is 0.15 or more.

5. The lubricant composition for shock absorbers according to claim 1, wherein the mixing ratio of the pentaerythritol tetraester in the pentaerythritol esters is 60% or more.

6. The lubricant composition for shock absorbers according to claim 1, wherein only a pentaerythritol diester and a pentaerythritol tetraester are contained as the pentaerythritol esters.

7. The lubricant composition for shock absorbers according to claim 1, wherein the pentaerythritol esters are contained in an amount of 5% or more.

8. A shock absorber, comprising the lubricant composition for shock absorbers as claimed in claim 1.

9. A method of adjusting frictional property of a lubricant composition for shock absorbers containing a base oil and pentaerythritol esters, comprising the step of: adjusting a mixing ratio of pentaerythritol tetraester in the pentaerythritol esters to be 40% or more, thereby adjusting the frictional property of a lubricant composition for shock absorbers based on responsiveness RI and an average frictional force $F_{ave}$ at the time of minute amplitude so that the responsiveness RI relative to the average frictional force $F_{ave}$ is higher, supposing that the responsiveness RI is a ratio ($\{F_{sa}-F_{ave}\}/F_{ave}$) of a difference between a peak frictional force $F_{sa}$ and the average frictional force $F_{ave}$ in transition from a stationary state to a sliding state at the time of minute amplitude to the average frictional force $F_{ave}$ at the time of minute amplitude.

10. The adjusting method according to claim 9, wherein the frictional property of the lubricant composition for shock absorbers are adjusted by adding the pentaerythritol esters so that the lubricant composition for shock absorbers has frictional property represented by the following formula (2):

$$RI > 1.75 \times F_{ave} - 0.05 \qquad (2)$$

11. The adjusting method according to claim 1, wherein the frictional property of the lubricant composition for shock absorbers are adjusted by adding the pentaerythritol esters so that the responsiveness RI is 0.1 or more and the average frictional force $F_{ave}$ is less than 0.12.

12. The lubricant composition for shock absorbers according to claim 1, wherein the lubricant composition has frictional property represented by the following formula (1):

$$RI > 1.75 \times F_{ave} - 0.05 \qquad (1)$$

wherein the responsiveness RI is a ratio ($\{F_{sa}-F_{ave}\}/F_{ave}$) of a difference between a peak frictional force $F_{sa}$ and an average frictional force $F_{ave}$ in transition from a stationary state to a sliding state at the time of minute amplitude to the average frictional force $F_{ave}$ at the time of minute amplitude.

13. The lubricant composition for shock absorbers according to claim 1, wherein a mixing ratio of the pentaerythritol ester other than the pentaerythritol tetraester in the pentaerythritol esters is 5% or more and 60% or less.

14. A lubricant composition for shock absorbers, comprising:
a base oil; and
pentaerythritol esters which comprise a first pentaerythritol ester containing 80% or more pentaerythritol tetraester and a second pentaerythritol ester containing 80% or more pentaerythritol diester,
wherein a mixing ratio of the first pentaerythritol tetraester in the pentaerythritol esters is 40% or more.

* * * * *